COLOR TELEVISION RECEIVER OSCILLATOR SYSTEM

Filed June 29, 1954 2 Sheets-Sheet 1

INVENTOR.
NORBERT D. LARKY
BY
ATTORNEY

Oct. 13, 1959 N. D. LARKY 2,908,747

COLOR TELEVISION RECEIVER OSCILLATOR SYSTEM

Filed June 29, 1954 2 Sheets-Sheet 2

INVENTOR.
NORBERT D. LARKY

BY [signature]

ATTORNEY

United States Patent Office

2,908,747

Patented Oct. 13, 1959

2,908,747

COLOR TELEVISION RECEIVER OSCILLATOR SYSTEM

Norbert D. Larky, Somerville, N.J., assignor to Radio Corporation of America, a corporation of Delaware Application June 29, 1954, Serial No. 440,106

3 Claims. (Cl. 178—5.4)

The present invention relates to synchronizing and time multiplexing circuits, and more particularly to synchronizing and time multiplexing circuits of the type employed in color television receivers.

Color television provides the reproduction on the viewing screen of the receiver of not only the relative luminescence and brightness but also the color hue and saturation of the color details in the original scene. The electrical transfer of the color images is accomplished by additive methods. Additive methods produce natural color images by breaking down the light from an object into a predetermined number of selected primary or component colors. Component colors may then be transferred electrically by analyzing the light from an object into not only its image elements as is accomplished by normal scanning procedure, but also by analyzing the light from elemental areas of the image into selected primary or component colors and deriving therefrom a signal representative of each of the selected color components. The color image may then be reproduced at a remote point by appropriate reconstruction from a color signal.

In order that the reproduction of a color image may be achieved with suitable fidelity in a receiver which is adapted to receive color television signals and perform the functions of the reconstruction of the color image on an appropriate color image reproducer, it is important that complete cooperation between the transmitter and receiver be accomplished. As a result, much emphasis is placed on the development and utilization of synchronizing methods in color television wherein it is necessary to not only maintain accurate deflection scanning, but also to provide accurate sychronism in the timing of the color signal selection.

In order that the need for color sync signal synchronization of extreme accuracy might be appreciated, consider first the nature of the color television signal which conveys both the monochrome and color image to the receiving apparatus. It is to be understood that the color image information is accompanied by a sound modulated subcarrier which conveys the sound information; this sound subcarrier is located in the transmitted signal spectrum at a position 4½ mc. from the carrier signal of the transmitted video information.

The color television picture is resolved into a set of four different types of signals. One of these component signals is the synchronizing signal which sychronizes the deflection circuits of the receiver with the information which is being transmitted.

The second component color signal is termed the luminance or monochrome information. This information corresponds to the information which is normally transmitted for a monochrome image in black-and-white television signal transmission. When considered in terms of its use in the transmission of color television information, it is important to realize that the luminance or monochrome signal is actually formed by the combination of three primary color signals. It has been found that the component color signals, namely red, green, and blue, which are used in color television, do not appear equally bright because they are located in different parts of the spectrum and hence stimulate the brightness sensation by different amounts. However, if the three primaries are mixed in right proportions, it has been found that the green primary, which is located at the center of the visible spectrum, accounts for 59% of the brightness sensation, while the blue primary accounts for 11% of the brightness sensation, and the red primary accounts for 30% of the brightness sensation. It then follows that a monochrome component color television signal may be formed by cross-mixing red, green, and blue primary signals according to the proportions whereby 59% green signal, 30% red signal, and 11% blue signal, are combined to form a unit white signal. This resultant signal is termed the monchrome or luminance signal, or when referred to in terms of the circuit components which are used in color television receivers, the Y signal. This Y signal is generated in accordance with existing scanning standards; i.e. 525 lines, 60 fields per second, and 30 frames per second, and is treated exactly like a standard monochrome signal with respect to bandwidth and the addition of synchronizing and blanking pulses.

The additional signals required to produce a color picture are the chrominance signals and the color synchronizing signals. Consider first the nature of the chrominance signal. It has been shown that the monochrome or luminance signal already contains predetermined amounts of component color signals, namely the Y signal which is made up of, as has been stated, 59% green, 30% red and 11% blue; it then follows that if it is desired that red, green, and blue signals be required, signals of the type $R-Y$, $G-Y$, and $B-Y$ will indicate how each color in the televised scene differs from the corresponding color in the monochrome signal.

It would appear from the preceding paragraph that to keep the monochrome and the color information representative of a color television picture, means must be provided for transmitting a trio of color-difference signals. Actually since color-difference information signals are interrelated, it would only be necessary to transmit two of the three color-difference signals with the third color-difference signal being formed at the receiver by suitable recombination of the two transmitted color-difference signals. In choosing a pair of color-difference signals which are to be formed for inclusion with the color television signals it has been found convenient to adopt a pair of signals known as I and Q signals rather than the color-difference signals of the $R-Y$, $G-Y$, and $B-Y$ type. The I signal is a wide band color-difference signal describing information along what is principally an orange-cyan axis. The Q signal is a narrow band signal which describes information along what is principally a green-purple axis. The choice of the I and Q system rather than, for example, an $R-Y$ and $B-Y$ system is made due to the fact that the eye has increased acuity for information along the orange-cyan axis the use of a wide band orange-cyan axis signal provides for improving the reproduction of color edges in the reproduced color picture. This is tantamount to prescribing that for fine detail, monochrome information is utilized, for large patches of color detail three-color information is utilized, and for intermediate sized patches of color detail two-color information is utilized.

The manner of transmitting the chrominance information is one involving the use of a unique type of color subcarrier. This color subcarrier has a frequency of approximately 3.58 mc. which is approximately 0.6 mc. removed from the upper edge of the practical video signal transmission band which is located at approximately 4.2 mc. The manner of modulating the color subcarrier is one using what is termed the two phase modulation technique. In this modulation technique one color subcarrier having a frequency of approximately 3.58 mc. at one phase is amplitude modulated by the I signal; the Q signal is used to amplitude modulate a second subcarrier having the same frequency as the first subcarrier but at a second phase. The I and Q signal modulated subcarriers are then combined in a common transmission channel to form a unique type of modulated color subcarrier in which not only are the I and Q information present, but also, as will be described later in the specifications, color information through the entire gamut of the useable color range including the previously mentioned *R—Y*, *G—Y*, and *B—Y* color-difference signal information. The hue of the signals which are included in the modulated color subcarrier are at particular phases of the chrominance signal. The saturation associated with a particular hue will be associated with the amplitude of the component signal having the phase prescribed by the hue. At the receiver the signal information relating to any desired hue may be recovered by synchronous detection; that is, the heterodyning of the modulated color subcarrier by a locally generated heterodyning signal having the frequency of the color subcarrier but having the phase associated with the particular hue being demodulated. If a multiplicity of hues are required for demodulation at the receiver it follows then that a corresponding set of heterodyning signals must be provided each having the frequency of the modulated color subcarrier and a phase related to the corresponding hue.

The color television signal, which represents both monochrome information and the hue and saturation information is then transmitted to the color television receiver. It follows from the preceding paragraph that if synchronous detection is to be employed, then means must be provided for accurately synchronizing the phases of locally generated heterodyning or synchronous detection signals with the color information which is being sent at the transmitter. This is uniquely accomplished by including a color synchronizing burst of approximately 8 cycles of the color subcarrier frequency on the back porch of the horizontal synchronizing pulse. The phase of the color synchronizing burst is such that it leads the I signal by 57°. The phase of the burst will also bear a predetermined phase relationship with each of the many other hues which are included in the modulated color subcarrier.

In order for the color synchronizing burst to provide synchronous detection signals having accurately controlled phases in the color television receiver, it is evident that frequency and phase synchronizing circuits having unusual characteristics both from the standpoint of accuracy and also the ability to achieve synchronism with a color synchronizing burst of very short duration must be employed in the color television receiver. It is to provide new and improved methods of utilizing the color synchronizing burst for local oscillator synchronization in a receiver that the present invention is dedicated.

There are different methods which may be used for synchronizing a color oscillator in a color television receiver using a color synchronizing burst; one is to use the method known as injection-locking wherein the color synchronizing burst is injected as an appropriate parameter of the color oscillator to cause the color oscillator to fall into synchronism at the frequency and phase of the color synchronizing burst. Another method is to utilize the principles of automatic frequency control wherein by using a suitable phase and frequency comparison system, the phase and frequency of the output of the color oscillator are compared with the phase and frequency of the color synchronizing burst leading to the production of a reference signal which is indicative of the phase and frequency relationship between the two signals; this reference signal is then used to operate a suitable frequency control device which returns the frequency and phase of the color oscillator to that prescribed by the color synchronizing burst. Both of these methods will be employed in the present invention.

Still another concept which will play a large part in the teaching of the present inventoin is that relating to start-stop oscillator operation. The teachings relating to start-stop operation recognized the fact that if the color oscillator is caused to cease oscillating or to reduce its oscillation level at the completion of a scanning line, then when the oscillator is caused to start oscillating again under the influence of the color synchronizing burst the process of phase and frequency synchronism is greatly facilitated.

The teachings of the present invention will also include application of start-stop oscillation in addition to phase and frequency control in a manner which represents a multiple combination of functions utilizing a single electron tube or electron control device. This constitutes a simplification of the circuitry which is associated with the color synchronizing or color hold circuit in a color television receiver. The present invention teaches the use of a compact and simple electron tube circuit to which chrominance information and a gate pulse are applied, the output of the circuit yields a synchronized color demodulating signal of constant amplitude during the scanning line.

It is therefore an object of this invention to provide a simplified synchronized start-stop oscillator circuit.

It is yet another object of this invention to provide an improved start-stop oscillator circuit.

It is still another object of this invention to provide a color oscillator circuit combining automatic frequency control and involving start-stop operation.

It is yet another object of this invention to provide a color oscillator combining the functions of injection synchronism and improved start-stop operation.

It is yet another object of this invention to provide a color oscillator which has improved start-stop oscillation and which utilizes both automatic frequency control and injection phase lock for providing an output signal of improved synchronism characteristics.

According to this invention a multigrid electron tube is used which includes an oscillator circuit in association with at least its control grid. The chrominance signal and the gate pulse are applied simultaneously to a space charge distribution grid, the anode, and to the oscillator coupled to the control grid, whereby start-stop action of the oscillator during the gate pulse is effectively accomplished in addition to permitting the color synchronizing burst to be multiplexed in a suitable frequency control system for controlling the frequency and phase of the oscillator circuit.

In one form of the invention the multiplexed synchronizing burst during the duration of the gate pulse is directed into the oscillator circuit to yield injection-locking of the oscillator frequency as it resumes oscillation prior to the start of the scanning line.

In another version of the invention the color synchronizing burst is mixed with the oscillator signal within the multigrid tube to cause a frequency indicative reference signal to be produced at the anode; this frequency indicative reference signal may then be applied to one of the control electrodes of the oscillator circuit to compensate for any frequency and phase shifts which might take place.

In still another version of the invention a multigrid electron tube which is associated with an oscillator circuit and in which discriminator action provides a phase and frequency difference indicative signal in its cathode-plate circuit with this frequency and phase indicative signal applied to a control grid of the multigrid electron tube whereby additional amplification of the frequency and phase difference indicative signal is accomplished.

Other and incidental objects of this invention will become apparent from a consideration of the specification and an inspection of the accompanying drawings in which.

Figure 1:
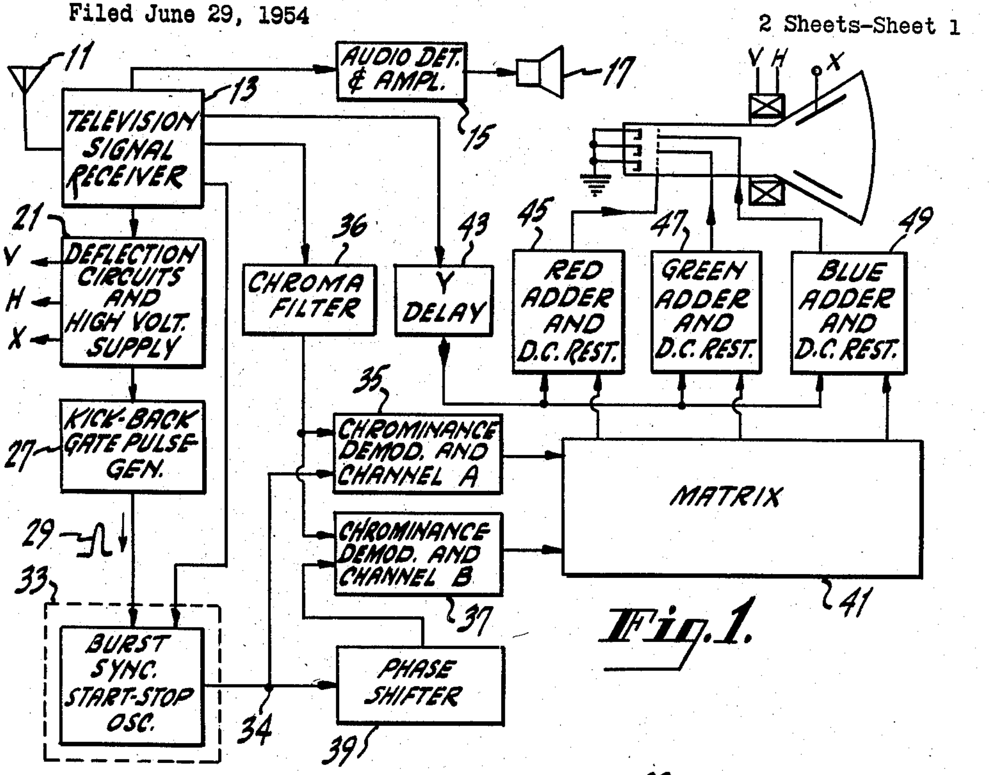
Figure 1 shows a block diagram of the color television receiver which employs a burst synchronized start-stop oscillator following the teachings of the present invention.

Consider first the block diagram of the color television receiver shown in Figure 1. Here the incoming signal arrives at the antenna 11 and is applied to the televison signal receiver 13. The television signal receiver 13 then demodulates the color television signal including the sound information, which is transmitted on a sound carrier 4½ mcs. removed from the picture carrier. The television signal receiver 13 includes the functions of first detection, intermediate frequency amplification, second detection and automatic gain control. Many of these functions are described in chapter 22 of the book "Harmonics, Sidebands and Transients in Communication Engineering" by C. Louis Cuccia published by the McGraw-Hill Book Co. in 1952.

The sound information is then recovered by using, for example, the well known principles of intercarrier sound in the audio detector and amplifier 15. The recovered information is then applied to the loud speaker 17.

The color television signal information relating to the image is accommodated in at least four channels of the color television receiver, these channels being adapted to produce the recovered color signals which are applied to the color kinescope 19.

One branch coupled to the television signal receiver 13 is concerned with the picture synchronizing signals. This branch couples the color television signal to the deflection circuits and high voltage supply 21 which delivers deflection signals to the yokes 23, in addition to a high voltage signal to the ultor 25. Another function of the deflection circuits and high voltage supply 21 is the activation of the kickback gate pulse generator 27. The kickback gate pulse generator 27 is usually a winding which is included on the high voltage supply transformer; it has the function of providing a gating pulse 29 during the horizontal blanking period.

Another branch coupled to the television signal receiver 13 couples the color television signal to the burst separator 31 upon which is also impressed the kickback pulse 29. The kickback pulse is timed whereby it opens a burst gate during the duration interval of the color synchronizing burst thereby causing burst separation. The separated burst is then fed by the burst separator 31 to the burst synchronized start-stop oscillator 33 which, utilizing the separated burst and the kickback pulse 29 in a manner to be described, produces a local oscillator signal which is accurately synchronized with the phase and frequency of the color synchronizing burst.

Another branch coupled to the television signal receiver 13 couples the color television signal simultaneously to the chrominance demodulator and channel A 35 and the chrominance channel and demodulator B 37. At the same time, the burst synchronized start-stop oscillator 33 delivers a synchronized synchronous detection signal to the chrominance demodulator and channel A 35 and a phase shifted synchronous detection signal to the chrominance demodulator and channel B 37 by use of the phase shifter 39. In the chrominance demodulator and channel A 35 and the chrominance demodulator and channel B 37, synchronous detection of a predetermined group of color-difference signals is realized. These color-difference signals may be I and Q signals, $R-Y$ and $B-Y$ signals, or any group of signals which may be suitable for eventual reconstruction of component color image information.

In addition suitable filtering action is provided in channel A and the channel B, this filtering action being characteristic of the particular color-difference signals being used. The outputs of the chrominance demodulator and channel A 35 and the chrominance demodulator and channel B 37 are applied to the inverter and matrix circuit 41 at whose output $R-Y$, $G-Y$, and $B-Y$ signals are realized.

The fourth branch coupled to the television signal receiver couples the color television signal to the Y or luminance channel. The Y signal information is passed through the Y delay line 43 and applied simultaneously to the red adder and D.-C. restorer 45, the green adder and D.-C. restorer 47, and the blue adder and D.-C. restorer 49 to which are also applied the corresponding color-difference signals thereby causing the production of component red, green, and blue signals which are applied to appropriate control grids of the color kinescope 19.

Figure 2:
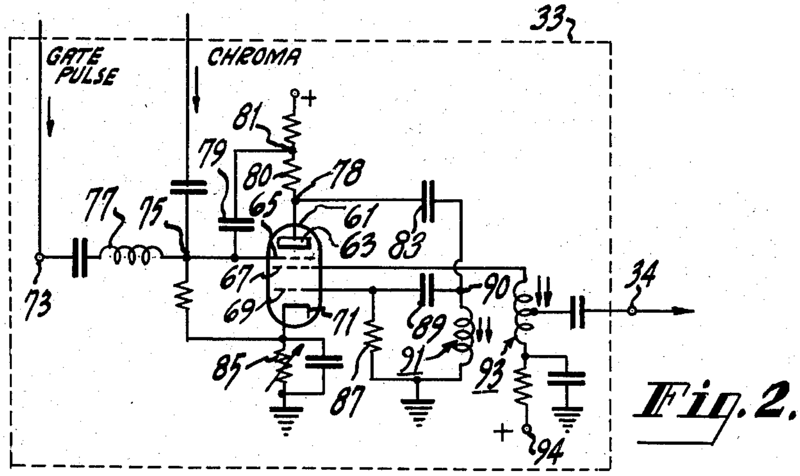
Figure 2 shows one version of the present invention employing the principles of injection-locking.

Consider the burst synchronized start-stop oscillator circuit 33 which is shown in Figure 2. This circuit utilizes the electron tube 61 to whose control grid 69 is coupled the resonant circuit 91 and the grid leak arrangement made up of the condenser 89 and the resistor 87. A second resonant circuit 93 is coupled to the screen grid 67; by proper adjustment of coupling between the control grid 69 and its associated resonant circuit and the screen grid 67 and its associated resonant circuit, namely the resonant circuit 93, oscillations are developed in the portion of the electron tube 61 which include not only the screen grid 67, the control grid 69, but also the cathode 71 and its degeneration circuit 85.

The gate pulse, which is applied to the terminal 73 is applied through the isolating RF choke 77 to the third grid 65 terminal which is designated 75 to which terminal is also applied the chroma. The capacitor 79 is connected from the terminal 75 to the anode resistor terminal 81. A second capacitor 83 is connected from the anode resistor terminal 81 to the control grid resonator 91 terminal which is designated as 90. Consider the action of the circuit during the scanning line preceding the action of the gate pulse which occurs between scanning lines, or rather during the blanking period. Oscillations are developed in both the resonators 91 and 93 due to the action of the multigrid electron tube utilizing the screen grid 67 acting as the anode for the oscillator circuit. The third grid 65 is principally a space charge distribution grid; that is, it controls the proportion of space charge which goes to either the anode 63 or the screen grid 67. When the potential of the third grid 65 is sufficiently low the total space charge will divide so that the bulk of the current will flow principally to the screen grid 67 with only a very small amount reaching the anode 63. However, when the third grid 65 is made sufficiently positive, then the current reaching the screen grid 67 is greatly reduced with the bulk of the space charge current reaching the anode 63. It is important to note that during this time, the action of greatly reducing the space charge current flowing to the screen grid 67 will cause the oscillator to either cease oscillating or to reduce its oscillation level to a vastly reduced level.

Consider the action resulting from the gate pulse applied to the terminal 73. This gate pulse suddenly raises the potential of the third grid 65 to a large positive potential during the horizontal blanking period. The bulk of the space charge current in the tube 61 then goes to the anode 63. This has the double action of causing the oscillator which is coupled to the screen grid 67 and the control grid 69 to either cease oscillating or to greatly reduce the level of oscillation; in addition since the bulk of the space charge current now travels to the anode 63, the chroma which is impressed on the grid 65 during this gate pulse is caused to travel to the anode 63 and be developed across the anode resistor 80. At the same time, however, because of the coupling action of the condenser 79 from the terminal 75 to the anode resistor terminal 81 the positive gate pulse is also caused to act whereby the anode potential 63 is caused to go even more positive thereby causing an additional amount of current to go into the anode 63 with still less current reaching the screen grid 67 thereby increasing the effectiveness of the start-stop action. During the duration of the gate pulse the chroma is pulsed into the anode circuit; however, by proper timing of the gate pulse, this chroma information consists of principally the color synchronizing burst. Because of the coupling of the condenser 83 from the anode resistor terminal 81 to the terminal 90 which forms one terminal of the grid resonator 91, the color synchronizing burst will then be injected into the grid resonator 91 to cause injection-locking of the oscillator portion of the circuit so that as the oscillator resumes oscillating just prior to the start of the next scanning line, it will resume oscillation at the phase and frequency prescribed by the color synchronizing burst. The coupling action of the condenser 83 from the anode resistor 81 to the terminal 90 of the grid resonator 91 has an additional function—for a brief portion of time during the horizontal blanking period the gate pulse will also cause the terminal 90 and therefore the control grid 69 to go positive. This will cause a loading of the control grid 69 in such a way as to effectively augment the stopping action of the oscillator which has already been accomplished by the combined action of the space charge distribution grid 65 causing the bulk of the current to pass to the anode 63 and the action of the gate pulse on the anode 63 causing an additional increase in positive potential on the anode 63.

The burst synchronized local oscillator signal will be produced at output terminal 34 only between scanning lines, that is, during a great portion of the horizontal blanking period there will be no signal appearing at the output terminal 34 because of the start-stop action of the oscillator. Upon resumption of oscillation, that is, during substantially a duration interval of the color synchronizing burst, an output signal which is in accurate phase and frequency synchronism with the frequency and phase prescribed by the color synchronizing burst will be developed at the output terminal 34.

Figure 3:
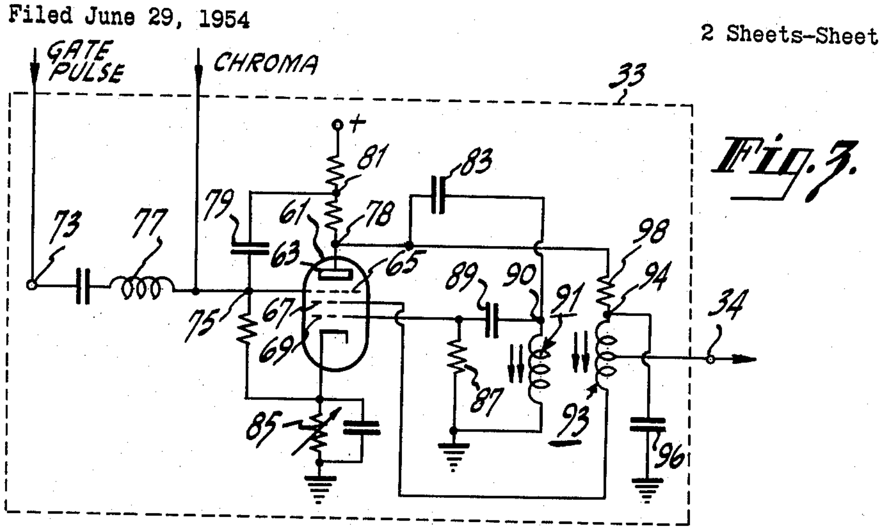
Figure 3 shows another version of the present invention employing both injection-locking and automatic frequency control.

The burst synchronized start-stop oscillator circuit shown in Figure 3 is identical to that shown in Figure 2 with the exception of the fact that the terminal 94 which in the circuit of Figure 2 provides the positive potential for the screen grid 67, is, in the circuit of Figure 3, connected to the anode terminal 78 by way of resistance 98. The operation of this circuit utilizing this new connection is to be described in the following way. The circuit is caused to have the effect of the start-stop action described in connection with the circuit shown in Figure 2. However, during the time of the color synchronizing burst the oscillations are caused to be started once more thereby causing modulation of the space charge current emanating from the cathode 71 and passing through the control grid 69 and the screen grid 67 on the way to the anode. During the duration of the color synchronizing burst, however, the color synchronizing burst signal is also developed across the third grid 65, which, as has been described, also provides the function of determining the space charge distribution between the screen grid 67 and the anode 63. A multiplication of the signals describing the color synchronizing burst and the oscillations provided by the oscillator circuit takes place in the election stream of tube 61 to develop a D.-C. component voltage at the anode terminal 78 which is indicative of any phase and frequency difference between the color synchronizing burst and the oscillations developed in the oscillator circuit; the tube 61 therefore is caused to operate both as an oscillator tube and a phase and frequency discriminator tube in addition to the start-stop action and the burst multiplexing action which was described in connection with Figure 2. Note that the screen grid 67 is then connected through the resonator 93 to the terminal 94 which is connected through the resistor 98 to the anode terminal 78. A capacitance 96 is connected between the terminal 94 to ground. This capacitance 96 provides the function of integrating the phase and frequency comparison or frequency indicator voltage which appears during the duration time of a color synchronizing burst so that a voltage of continuous amplitude will be available for frequency and phase control action. This frequency and phase control voltage is then provided to the screen grid 67 so that, should the frequency of the oscillator differ from that of the color synchronizing burst, the frequency control as provided by the discriminator action of the tube 61 in connection with the integrating capacitor 96 will correct the screen grid voltage 67 in a manner which will cause the oscillator to oscillate at a frequency and phase having a predetermined relationship with the frequency and phase of the color synchronizing burst.

The overall action of the burst synchronized start-stop oscillator 33 shown in Figure 3 may be summarized as follows: oscillations are produced in the circuits which are associated with the control grid 69 and the screen grid 67 of the tube 61; start-stop action and multiplexing of the color synchronizing burst to the anode circuit is provided by the injection of the chrominance signal and the gate pulse on the third grid 65. By utilizing the additional capacitors 79 and 83 which transfer the gate pulse and color synchronizing information to the anode circuit and to the control grid circuit of the oscillator portion of the overall circuit, effective stopping of the oscillator by the gate pulse is achieved. As the oscillator resumes oscillation, injection-locking of the multiplexed color synchronizing bursts to the control grid 69 permits the oscillator to operate at the frequency and phase of the color synchronizing burst. However, due to the fact that the injection signal lasts only for a very short length of time and is injected only preceding the scanning line during which frequency control is desired, the utilization of the tube 61 as a combined oscillator and phase discriminator device, which develops a phase discriminator voltage at the anode terminal 78, automatic frequency control of the oscillator phase during the next scanning line.

Figure 4:
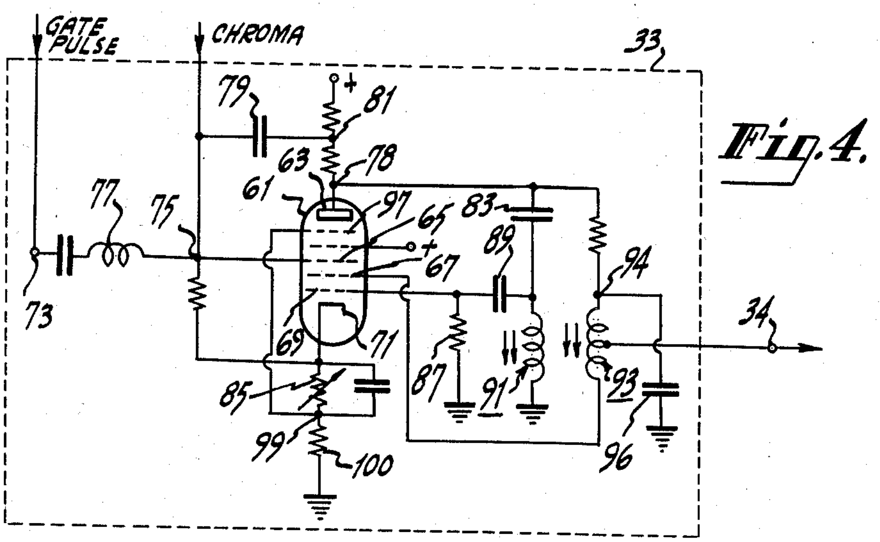
Figure 4 shows a version of the present invention employing automatic frequency control wherein the phase and frequency indicative reference signal provided by the frequency and phase comparator portions of the circuit is amplied within the multigrid electron tube.

The circuit shown in Figure 4 represents an important extension of the circuit shown in Figure 3. Here the tube 61 now includes at least an extra control grid, namely control grid 97. It is recognized from the circuit shown in Figure 3, that the phase discriminator voltage which is produced at the anode terminal 78, may also be produced in some portion of a cathode circuit since the same current which flows to the cathode will in general, at least in tubes of this variety, flow through the anode circuits, discounting of course the current which is collected by the screen grid and other grids during the time of the gate pulse. As is seen in the circuit shown in Figure 4, an additional resistor 100 is connected between the terminal 99 which formerly constituted the ground terminal in Figure 3 and the ground terminal as utilized in Figure 4. This potential which also gives an indication of the phase and frequency difference between the color synchronizing burst and the oscillations produced by the oscillator may then be applied directly to the extra control grid 97 in such a way that the phase discriminator signal is then given additional amplification within the electron tube 61 so that additional voltage is available at the anode terminal 78 for frequency control or frequency compensating action. This amplified automatic frequency control voltage as developed at the anode terminal 78 is then coupled to the terminal 94 and delivered through the resonator 93 to the screen grid 67 to yield automatic frequency control in a manner described in connection with the circuit shown in Figure 3.

Having described the invention, what is claimed is:

1. In a color television receiver adapted to receive a color television signal, said color television signal including a color synchronizing burst having predetermined frequency and phase, and a gate pulse generator adapted to provide a gate pulse having duration interval bearing predetermined relationship to the duration interval of said color synchronizing burst, a burst synchronized start-stop oscillator circuit comprising in combination, a multi-electrode electron control device, said multi-electrode electron control device having at least a cathode, a first control electrode, a second control electrode, a third control electrode and an output electrode, an output circuit, means for coupling said output circuit to said output electrode, an oscillator circuit, said oscillator circuit including at least one resonant circuit and coupled to said first control electrode and said second control electrode, said second control electrode characterized in that the potential applied to this control electrode yields frequency and phase control of oscillations produced in said oscillator circuit, means for coupling said color television signal to said third control electrode, means for coupling said gate pulse to said third control electrode, said first control electrode and said output circuit to multiplex said burst to said oscillator circuit to cause a reference signal to be produced in said output circuit which is indicative of the phase and frequency difference between said color synchronizing burst and the oscillations produced in said oscillator circuit, low pass filter means, means utilizing said low pass filter means for filtering said reference signal and applying said filtered reference signal to said second control electrode to achieve phase and frequency synchronization of said oscillator circuit, means for also utilizing said gate pulse coupled to said third control electrode, said first control electrode and said output electrode for causing the amplitude level of oscillations produced in said oscillator circuit to fall below a predetermined amplitude level for a predetermined portion of the duration interval of said gate pulse preceding said color synchronizing burst.

2. In a color television receiver adapted to receive a color television signal including a color synchronizing burst having a predetermined frequency and phase, and a gate pulse generator, said gate pulse generator adapted to provide a gate pulse having a duration interval bearing a predetermined relationship to the duration interval of said color synchronizing burst, a burst synchronized start-stop oscillator circuit comprising in combination, a multi-electrode control device having at least a cathode, a first control electrode, a second control electrode, a third control electrode, a fourth control electrode, and an output electrode, an output circuit, means for coupling said output circuit to said output electrode, an oscillator circuit, means for coupling said oscillator circuit to at least said first control electrode, said second control electrode characterized in that the potential applied to this control electrode yields frequency and phase control of oscillations produced in said oscillator circuit, means for coupling said color television signal to said third control electrode, means for coupling said gate pulse to said third control electrode, said first control electrode and said output circuit to multiplex said color synchronizing burst to said oscillator circuit to produce a reference signal in said output circuit which is indicative of the phase and frequency difference between said color synchronizing burst and the oscillations produced in said oscillator circuit, means for reapplying said reference signal to said fourth control electrode to provide additional amplification of said reference signal within said multielectrode electron control devices, low pass filter means, means utilizing said low pass filter means for filtering said amplified reference signal and applying said amplified filtered reference signal to said second control electrode to achieve phase and frequency synchronization of said oscillator circuit, means for also utilizing said gate pulse coupled to said third control electrode, said first control electrode and said output electrode for reducing the amplitude level of oscillations produced in said oscillator circuit to below a predetermined amplitude level for a prescribed interval preceding said color synchronizing burst.

3. In a color television receiver adapted to receive a color television signal including a color synchronizing burst having a predetermined frequency and phase, and a gate pulse generator adapted to provide a gate pulse having a duration interval bearing a predetermined relationship to the duration interval of said color synchronizing burst, a burst synchronized start-stop oscillator circuit comprising in combination, a multielectrode control device having a plurality of control electrodes and an output electrode, means for coupling said output circuit to said output electrode, an oscillator circuit, said oscillator circuit including at least one resonant circuit and coupled to at least a first of said plurality of control electrodes to produce oscillations in said oscillator circuit, means for coupling said color television signal and said gate pulse to at least a second of said plurality of control electrodes and said output electrode whereby during the duration of said color synchronizing burst, discriminator action is performed in said multielectrode control devices which yields a reference signal in said output circuit which is indicative of the phase and frequency difference between the color synchronizing burst and oscillations produced in said oscillator circuit, means to utilize said gate pulse to produce stop action of said oscillator circuit for a predetermined interval of time preceding each color synchronizing burst, and reference signal integrating means coupled between said output circuit and one of said plurality of control electrodes.

References Cited in the file of this patent

UNITED STATES PATENTS

| | | |
|---|---|---|
| 2,248,481 | Schuttig | July 8, 1941 |
| 2,284,337 | Mulert | May 26, 1942 |
| 2,352,451 | Roemisch | June 27, 1944 |
| 2,659,009 | Emslie | Nov. 10, 1953 |
| 2,677,723 | McCoy | May 4, 1954 |
| 2,681,381 | Creamer | June 15, 1954 |

UNITED STATES PATENT OFFICE

CERTIFICATE OF CORRECTION

Patent No. 2,908,747

October 13, 1959

Norbert D. Larky

It is hereby certified that error appears in the printed specification of the above numbered patent requiring correction and that the said Letters Patent should read as corrected below.

Column 5, line 15, for "amplied" read -- amplified --; column 7, line 71, for "election" read -- electron --; column 8, line 46, after "78," insert -- provides --.

Signed and sealed this 19th day of July 1960.

(SEAL)
Attest:

KARL H. AXLINE
Attesting Officer

ROBERT C. WATSON
Commissioner of Patents